US005128199A

United States Patent [19]

Iyer et al.

[11] Patent Number: 5,128,199

[45] Date of Patent: Jul. 7, 1992

[54] METHOD FOR FIBER COATING WITH PARTICLES

[75] Inventors: Shridhar Iyer, East Lansing; Lawrence T. Drzal, Okemos, both of Mich.

[73] Assignee: Board of Trustees operating Michigan State University, East Lansing, Mich.

[21] Appl. No.: 609,449

[22] Filed: Nov. 5, 1990

Related U.S. Application Data

[62] Division of Ser. No. 484,779, Feb. 26, 1990, abandoned.

[51] Int. Cl.[5] ........................ B32B 5/16; B32B 15/00; B32B 17/00; D04B 1/00

[52] U.S. Cl. .................................... 428/240; 428/112; 428/113; 428/224; 428/288; 428/327; 428/408; 428/902

[58] Field of Search ................ 156/181; 428/288, 240, 428/112, 113, 327, 328, 224

[56] References Cited

U.S. PATENT DOCUMENTS 4,894,105 1/1990 Dyksterhouse et al. ............ 156/81

*Primary Examiner*—Patrick J. Ryan
*Assistant Examiner*—Richard P. Weisberger
*Attorney, Agent, or Firm*—Ian C. McLeod

[57] ABSTRACT

A system and method for uniformly coating one or more fibers (10) with particles of a material is described. The method uses a vibrator preferably an acoustic speaker (17*b*) in a housing (17*c*) to fluidize the particles ($P_1$) in a chamber (17 or 30) to deposit them on spread fibers (10*b*). The fibers can be in the form of a tow of fibers. After the particles are coated on the fibers, the particles can be bonded to the fiber such as by using a heater (19). The resulting product has a uniform deposit of the particles and in the case of the tow of fibers can serve as a prepreg for laminate structures to be produced from the coated tow of fibers.

4 Claims, 5 Drawing Sheets

FIG.4B

METHOD FOR FIBER COATING WITH PARTICLES

This is a divisional of copending application Ser. No. 07/484,779 filed on Feb. 26, 1990, now abandoned.

BACKGROUND OF THE INVENTION (1) Field of the Invention

The present invention relates to a method and system for the production of coated fibers. The present invention particularly relates to a composite prepreg with either a thermoplastic or thermoset matrix on fibers in a tow which is suitable for use in primary and secondary structural preform methods with significant cost, speed and environmental advantages. The present invention particularly relates to a method and system which uses a vibrating means in a housing to fluidize particles and to coat them on the fibers.

(2) Prior Art

High-speed, low-cost processing methods are required to produce prepreg composite materials for high volume applications with either thermoset or thermoplastic matrices dispersed through a tow of fibers. Conventional processes like hot melt prepregging rely on the creation of a low viscosity matrix phase early in the process which is then forced around and through the fiber tows at high pressure. Wetting of individual fibers at the microscopic level is the ultimate goal. For thermoset materials, dilution in solvents has been relied upon for composite fabrication or if the reaction window is long enough, elevated temperatures are used to lower resin viscosity. Thermoplastic matrices are inherently high in viscosity and elevated temperature and pressure can not always be used. Solution methods are commonly used. Environmental and health concerns as well as the costs associated with using and reclaiming high boiling solvents makes their use with these methods undesirable. Many high performance matrix resins are not soluble in any solvents and they are therefore not capable of being used in high volume applications at the present time.

The key feature to any successful processing method is the ability to place the polymer around the fibers to form the prepreg. A viable processing method should place the polymer in its final position on the fiber surface and should be applicable to any matrix.

(1) Solution Processing:

This method is used with both thermoset and thermoplastic matrices. Polymer is dissolved in a solvent and the fiber tow is impregnated with the resulting low viscosity solution (Turton, N., and J. McAinsh, U.S. Pat. No. 3,785,916). Complete removal of solvent after impregnation is a stringent requirement and is often a difficult step. Methylene chloride, acetone and N-methyl pyrrolidone are widely used as solvents. Epoxies, polyimides, polysulfone, polyphenyl sulfone and polyether sulfone are some of the matrices which have been solution-impregnated.

(2) Slurry Processing:

Polymer particles are suspended in a liquid carrier and the fiber tow is passed through a slurry tank which contains polymer particles. Polymer particles are trapped within the fiber tow. Taylor (Taylor, G. J., U.S. Pat. No. 429,105) outlines a process whereby the particles are suspended in water which is thickened with a material such as polyethylene oxide to increase the viscosity to 400–3000 cP at 25° C. O'Connor (O'Connor, J. E., U.S. Pat. No. 4,680,224), points out problems with this method which include finding the right concentration of slurry, maintaining the optimum concentration in the resin tank and accumulation of excess resin at the die entrance (where the impregnated tow is consolidated into a tape or flat sheet). The minimum void contents in the processed tape were about 2 to 4%. Another method (Dyksterhouse, R., Dyksterhouse, J. A., U.S. patent application Ser. No. 114,362, November 1987) impregnates the fibers in a gelled impregnation bath with plastic flow characteristics, shear-thinning behavior and a polymer binder in which the polymer particles are uniformly suspended. A PEEK-carbon fiber void-free composite was made by impregnating G30-500 carbon fibers in a gelled impregnation bath having a viscosity of 81000 cP.

(3) Melt Impregnation:

Direct impregnation of the fiber tow with molten polymer is possible. For thermoset matrices like epoxy, temperature and reaction kinetics allow for a continuous melt impregnation before reaction. For thermoplastics, two approaches have been used: (a) a cross head extruder feeds molten polymer into a die through which the rovings pass (Moyer, R. L., U.S. Pat. No. 3,993,726), and, (b) the fibers pass through a molten resin bath fitted with impregnation pins to increase the permeability of the polymer into the tow. The impregnation pins can be heated to decrease viscosity locally to further improve the impregnation process (Cogswell, F. N., et al. U.S. Pat. No. 4,559,262). In either case, the force exerted on the fibers e.g. die pressure for the crosshead extruder are extremely high and can cause fiber damage. The resulting prepreg usually lacks tack and drape.

(4) Film Stacking:

Layers of fiber reinforcement either in the form of unidirectional tows or woven fabrics are stacked with thermoplastic sheets as the matrix material and consolidated under pressure for long times (Lind, D. J., and Coffey, V. J., U.K. Patent 1,485,586). This method is widely used due to the relative ease of manufacture. Disadvantages include high resin content, the uneconomic (labor-intensive) nature of the process and difficulty in impregnating the fiber tow (high pressure forces the fibers together) with the high viscosity matrix material.

(5) Fiber Co-mingling:

A thermoplastic matrix can be spun into a fine yarn and co-mingled with the reinforcing fiber tow to produce a co-mingled hybrid yarn (Clemans, S. R., et al., Materials Engineering, 105, 27-30 (March 1988)). These hybrid yarns can be consolidated to form composite parts. An advantage of this technique is the drapeability of the hybrid yarn. The high cost involved in producing thermoplastic yarn and weaving it with the reinforcing fibers is a disadvantage.

(6) Dry Powder Impregnation:

Dry thermoplastic powder is introduced into a fiber tow which is then processed by heating to sinter the powder particles onto the fibers. This technique was first employed by Price (Price, R. V., U.S. Pat. No. 3,742,106) who passed glass roving through a bed (either fluidized or loosely packed) of thermoplastic powder. Polypropylene particles with an average diameter of 250 microns were used. The particles stick to the fibers due to electrostatic attraction. The tow is then heated and passed through a die to produce an impregnated tow. The impregnation is macroscopic, i.e. the particles coat clusters of fibers rather than individual fibers leaving unwetted areas and voids. The process is targetted mainly at producing short fiber reinforced thermoplastics. Ganga (Ganga, R. A., "Flexible Composite Material and Process and Apparatus for Producing Same", AT0113 (DPI8176); "Procede de Fabrication d'Ojbects Composites Obtenus", FR 2548084-A1 June 1983), fluidized polyamide particles less than 20 microns in size in a fluidization chamber, impregnated glass rovings and covered this with an outer sheath of a second material of lower melting point than the impregnated particles. The second sheath was extruded onto the tow. Muzzy (Muzzy, J. D., ASME Symposium on Manufacturing Science of Composites, p27-39 (April 1988)) recently demonstrated the ability to manufacture prepreg by passing a spread tow through an electrostatic fluidized bed of PEEK powder (50 microns).

Dry powder processes offer the optimum potential for the creation of a high speed, low-cost process if the creation of a void-free composite with controllable volume fractions can be achieved. An ideal process should have the following characteristics:

(i) It should be independent of matrix viscosity. Most high performance thermoset and thermoplastic matrices are either very reactive at the high temperatures necessary to reduce their viscosity or are highly viscous ($10^3$ to $10^5$ Poise) above their softening point (amorphous) or melting temperature (semi-crystalline). A viable dry powder process circumvents this problem by coating fibers individually with the required amount of matrix so that flow of the polymer takes place only over submicron distances between particles rather than centimeter distances from the outside to the inside of the fiber tows.

(ii) It should avoid the use of binders or solvents which have to be evaporated during the latter stages of the processing cycle. This can always be a source of voids which have a deleterious effect on the mechanical properties of the composite.

(iii) The average particle size of the material used is preferably approximately the same as the dimensions of the fiber for optimum impregnation. A significantly larger particle size will cause bridging and restrict impregnation due to physical limitations which results in a non-uniform distribution of resin between the fibers.

(iv) The concentration of powder particles in the "impregnation chamber" where they meet the fibers should be constant and controllable at all times.

(v) The mechanism of adhering the particles to the fibers should be controllable and independent of environmental conditions.

(vi) The resulting prepreg tape should be in a form that is flexible and drapeable so that complex parts can be formed easily.

(vii) The process should require minimal energy use, be free of labor intensive steps, capable of operating at high speeds and be capable of scale-up to large sizes.

Patents which relate to fiber handling which are of general interest are U.S. Pat. Nos. 2,244,203 to Kern; 3,017,309 to Crawford; 3,304,593 to Burklund; 4,534,919 to McAliley et al; and 4,714,642 to McAliley et al.

Objects

It is therefore an object of the present invention to provide a dry powder process for the uniform coating of fibers with particles of a material which meets all of the criteria previously discussed. Further, it is an object of the present invention to provide a process which is relatively simple and economical.

These and other objects will become increasingly apparent by reference to the following description and the drawings.

IN THE DRAWINGS

FIG. 1 is a schematic, front cross-sectional view of the system of the present invention, particularly a spreader 14 for a conveyed tow of fibers 10, a particle coating chamber 17, and a heater 19 for bonding the particles to the fibers 10.

Figure 3:
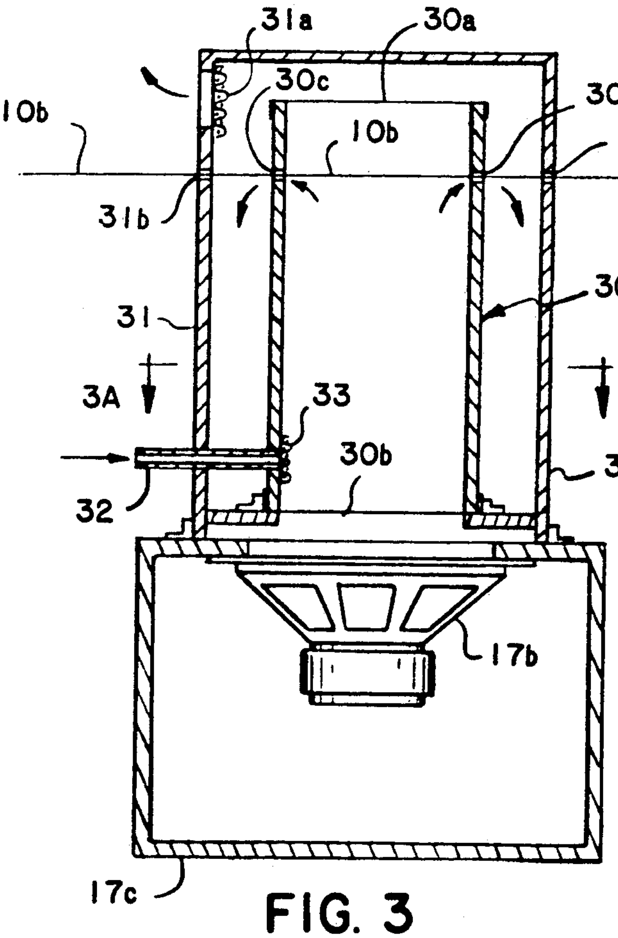

FIG. 3 is a front cross-sectional view of another type of chamber 30 for aerosolyzing the particles $P_1$, particularly illustrating the mounting of the chamber 30 in a casing 31.

Figure 3A:
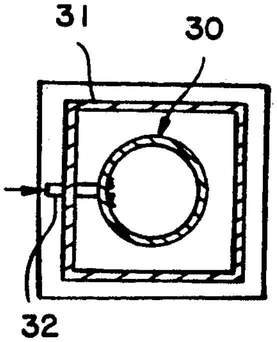

FIG. 3A is a cross-section along line 3A—3A of FIG. 3.

Figure 4A:
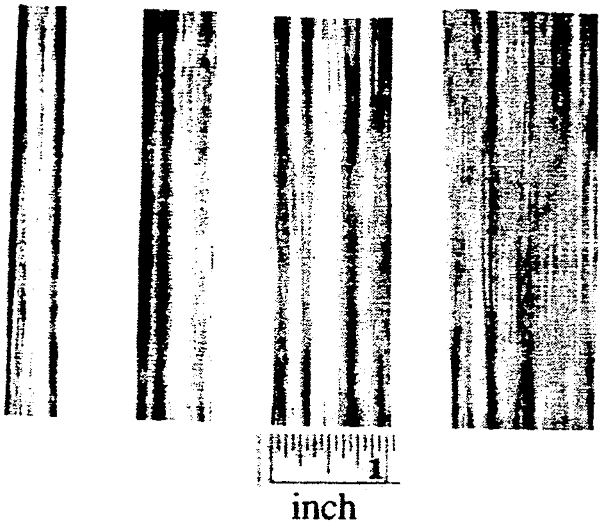
Figure 4B:
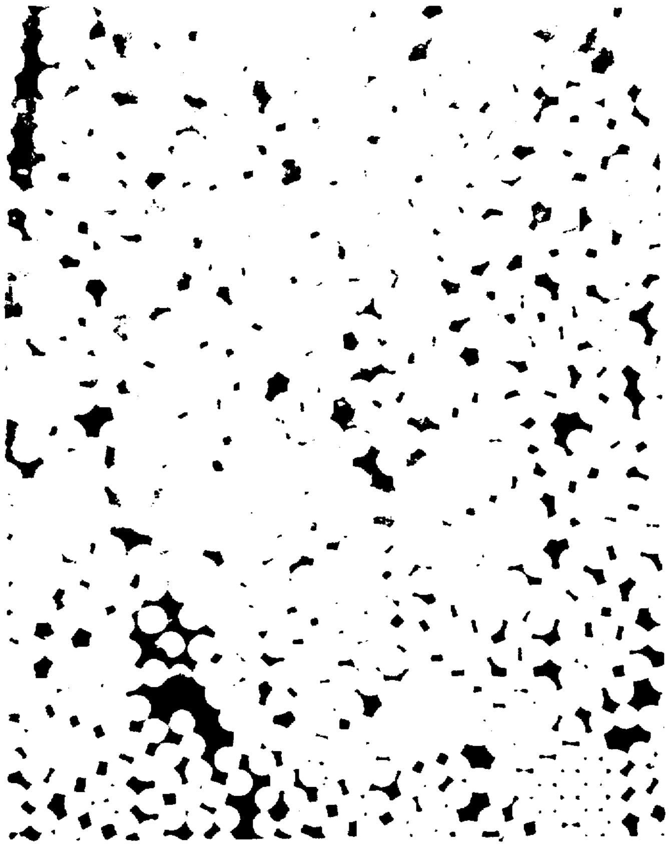

FIGS. 4A to 4B are photomicrographs of an impregnated tow of fibers (FIG. 4A) and composite formed after heating and consolidation (FIG. 4B).

GENERAL DESCRIPTION

The present invention relates to an improved system for coating particles of a material on a fiber which comprises: chamber means around the fiber for containing the particles to be deposited on the fiber; and vibrating means mounted in the chamber means such that the particles are fluidized and deposited on the fiber when the vibrator means is activated.

The present invention also relates to an improved system for coating particles of a material on a fiber which is to be conveyed through the system which comprises: chamber means around the fiber for containing the particles to be deposited on the fiber; and vibrating means mounted in the chamber means such that the particles are fluidized and deposited on the fiber as the fiber is conveyed through the system when the vibrator means is activated.

Further, the present invention relates to a system for spreading fibers and coating a powder on the fibers of a fiber tow to be conveyed through the system which comprises: feed means for feeding the tow of fibers; spreader means for spreading the tow of fibers from the feed means; chamber means around the tow of fibers for containing the powder to be deposited on the fibers; an acoustic speaker means mounted in the chamber means such that the powder is fluidized and directed at the tow of fibers when the speaker is activated; and take-up means for the coated tow of fibers.

The present invention also relates to a method for coating particles on a fiber which comprises: providing a system for coating particles of a material on a fiber comprising housing means around the fiber for containing the particles to be deposited on the fiber, and vibrating means mounted in the chamber means such that the particles are fluidized and deposited on the fiber when the vibrator means is activated; providing the fiber in the chamber means in the system wherein the fiber is coated with the particles when vibrating means is activated and activating the vibrator means to coat the fiber.

The present invention further relates to a prepreg for a laminate product which comprises a tow of fibers having beads of a thermoplastic polymer along the length of each fiber in the tow of fibers.

The present invention provides a low-cost powder processing method for producing a composite prepreg suitable for use with any preform processing method. Polymer powder particles are preferably acoustically fluidized and dispersed in a large chamber. Fibers are preferably also acoustically separated and then drawn through the chamber into the fluidized powder. Individual fibers are coated with particles uniformly and the particles adhere to the individual fibers in their final position so that heating can fix the particles in place. The resultant preferred prepreg is a flexible, drapeable material which is subsequently processed to produce a void-free, fully densified composite.

The process can be scaled-up and controlled with automated techniques. It can be used with any polymeric, metallic or ceramic matrix that can be produced in a powder form. Prepreg materials have been produced where the volume fractions of fiber controlled to two percent total derivation over a wider range of concentrations. The method has been used for fabricating prepreg specimens widths of 10 mm to 50 mm.

This invention particularly relates to a low-cost/high speed composite prepreg method. The method produces continuous fiber composite prepreg with fiber volume fractions controllable to within one percent. The method is continuous, requires no solvents, can be used with any fiber-matrix combination and is scalable to any prepreg size. Capital equipment and energy input for the process are low making this a viable low-cost processing method. The method is based on the use of acoustic energy to overcome gravitational forces as opposed to gas flow in conventional fluidization. Agglomeration and channeling of cohesive powders (approximate size <20 microns) makes their fluidization extremely difficult to accomplish by conventional gas fluidization techniques. The present invention, however, makes it possible to fluidize and entrain particles of any size at any desired concentration.

An acoustic speaker is preferably used to both separate the fiber tows into individual fibers and to entrain small polymer matrix particles in air or any suitable gas, whether reactive (e.g. oxygen) or non-reactive (nitrogen), in a chamber through which the fiber passes. The particles adhere to each fiber filament providing a uniform coating when subjected to heating so that the prepreg can be processed to any degree of consolidation downstream. The resulting prepreg is drapeable and can be used in weaving or preform operations.

The acoustic speakers have preferably a rating of about 8 ohms and 100 watts and a sound level of about 80 to 130 dB. The frequency is preferably between 11.5 to 12 Hz. Essentially any frequency can be used, preferably corresponding to the natural frequency of the coating chamber, including the end closures and the powder. Preferably the frequency can be anywhere in the audio to ultrasonic range and is preferably between 1 to 20,000 Hz which includes the audible range.

SPECIFIC DESCRIPTION

A model system consisting of carbon fibers (7.2 microns diameter) and a small diameter polyamide powder particles (9.2±4 microns average diameter and range 5 to 15 micron <20 microns) was used. Acoustic energy was responsible for aerosolization of the particles.

A schematic of the system is shown in FIGS. 1 and 1A to 1E. A fiber tow 10 was unwound from a spool 11. The tow 10 was passed through a guide ring 12 and between nip rollers 13 before passing over the spreader 14. The spreader 14 has a high sound level (80 to 130 dB) audio speaker **14*a* to separate the tow 10 into its individual filaments or fibers without damaging the fibers of the tow 10. Nip roller 13 and nip roller 15 maintained a constant slack in the spread tow 10*a* in the region above the speaker 14*a*. Circular cross-sectioned rods 14*b* maintain the separation of the fibers in the spread tow 10*a*. The tow 10*a* zig-zags over and under the rods 14*b***.

Figure 1:
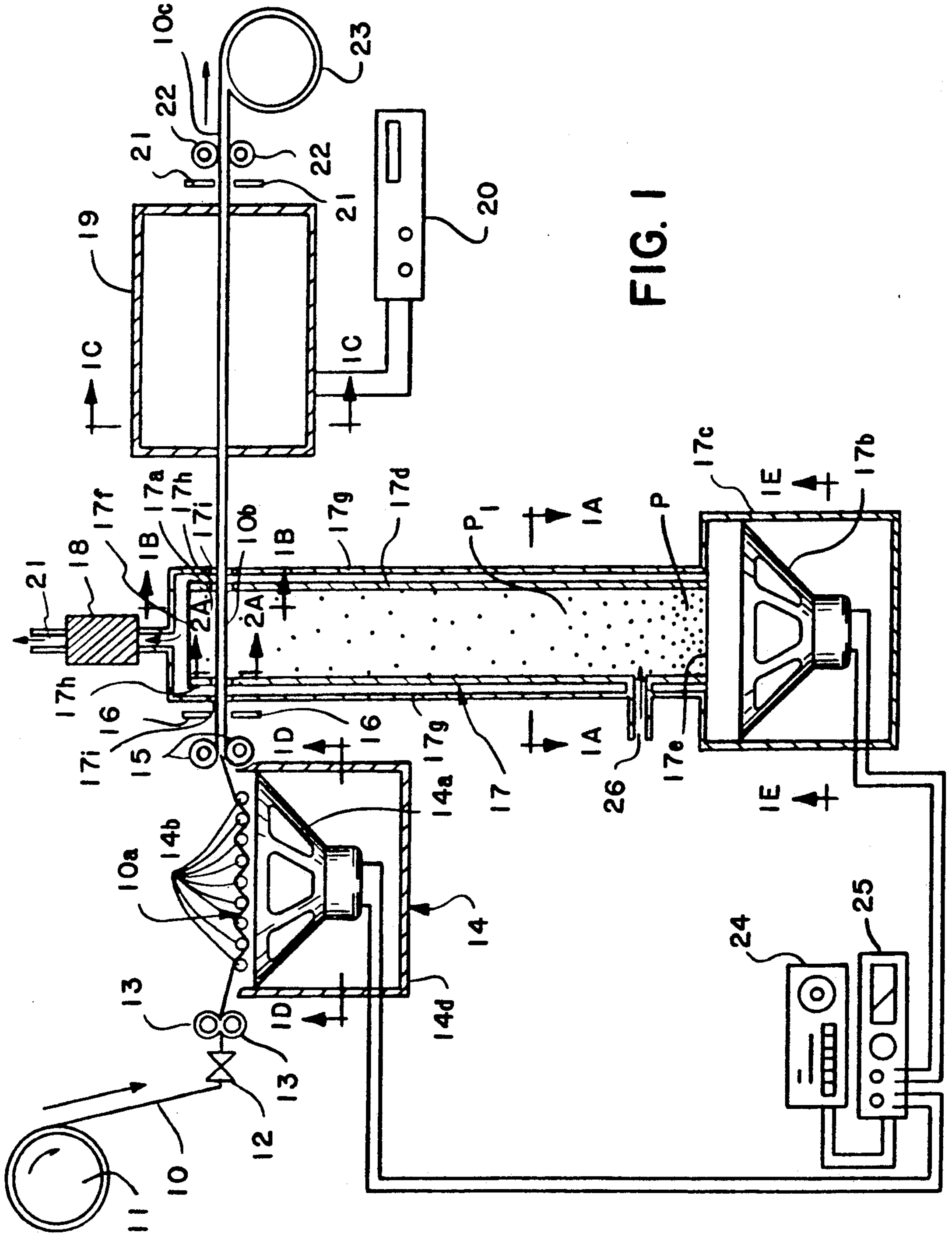
FIG. 1A is a cross-section along line 1A—1A of FIG. 1 showing the cross-section of a chamber section **17*d*** for aerosolyzing the particles P.
FIG. 1B is a cross-section along line 1B—1B of coating section **17*a* of FIG. 1**.
FIG. 1C is a cross-section along line 1C—1C of heater 19 of FIG. 1.
FIG. 1D is a cross-section along line 1D—1D of spreader 14 of FIG. 1 showing the speaker **14*a***.
FIG. 1E is a cross-section along line 1E—1E of of FIG. 1 showing the speaker **17*b* in housing 17*c***.
Figure 1A:
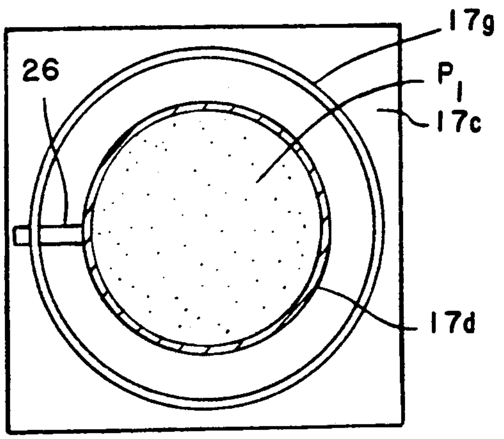
Figure 1B:
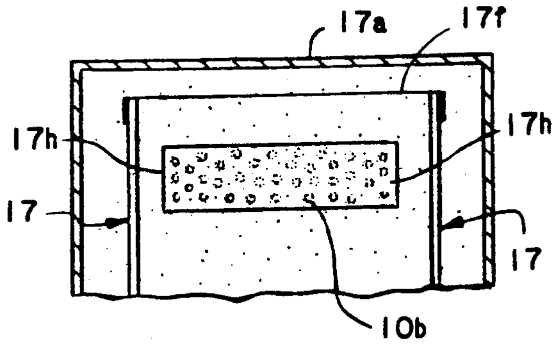
Figure 1C:
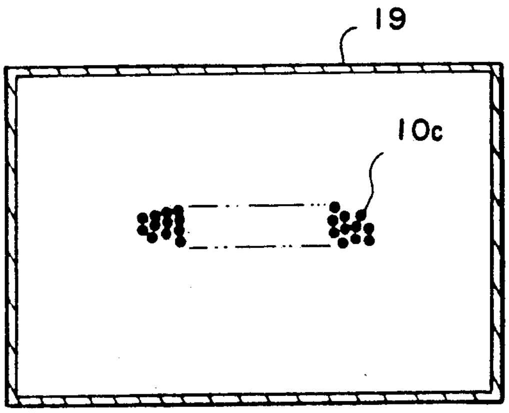
Figure 1D:
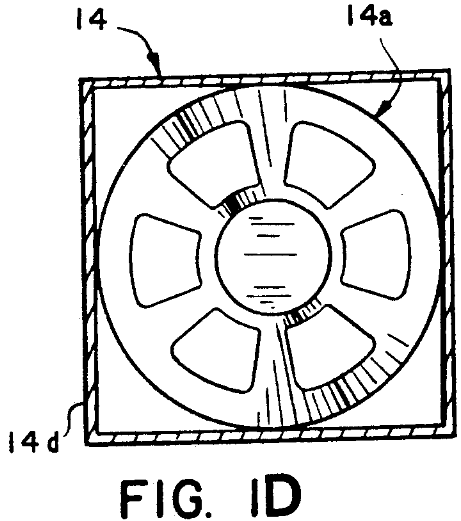
Figure 1E:
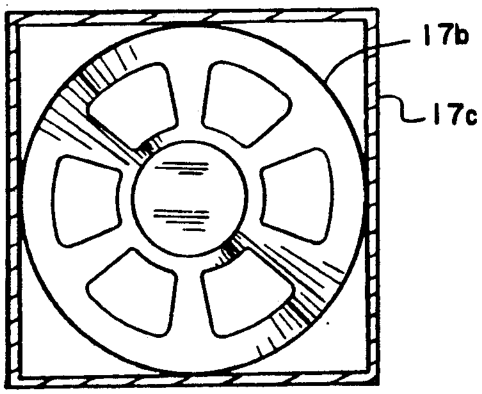
Figure 2:
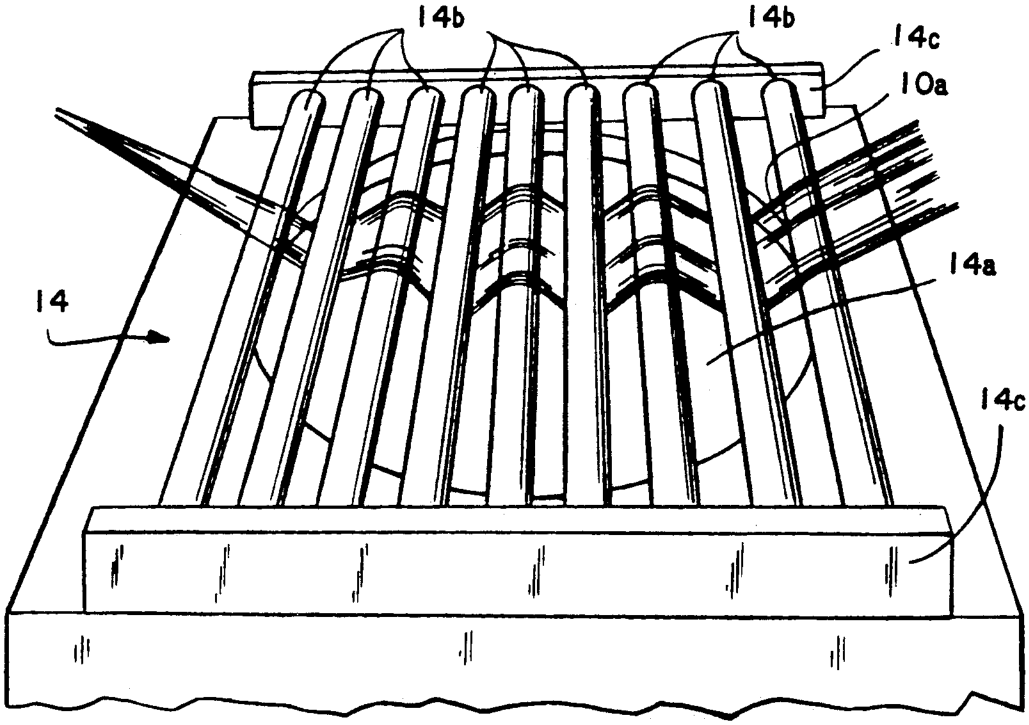
FIG. 2 is a perspective view of an enlarged view of the spreader 14 illustrated in FIG. 1, particularly showing the mounting of the rods **14*b* relative to the speaker 14*a***.

FIG. 2 is an enlarged view of the spread tow **10*a* showing the rods 14*b* mounted with axis in parallel on spaced apart holders 14*c*. As can be seen the speaker 14*a* is mounted adjacent and below the rods 14*b***.

The width of the spread tow **10*a* of fibers is controlled by guides 16 and the spread tow 10*a* is passed through a coating chamber 17 with a coating section 17*a* where aerosolized particles $P_1$ impact and coat individual fibers of the spread tow of fibers 10*a*. The particles $P_1$ are aerosolized by a second speaker 17*b* mounted in an enclosed housing 17*c* on the bottom of chamber 17. Diaphragm 17*e* made of rubber, separates the speaker 17*b* from the particles P in chamber 17. Rubber diaphragm 17*f* provides a closure for chamber 17** at the opposite end.

The diaphragms **17*e* and 17*f*, along with housing 17*d* and the particles in the chamber, have a natural resonance frequency which is preferably matched by the speaker 17*b*. It has been found that resonance provides constant controllable aerosolization of the particles $P_1$ in the coating section 17*a*. The natural frequency of the chamber 17 can be varied as a function of the length and diameter of the chamber 17 as well as the resiliency or lack thereof of the end closures, which are preferably flexible diaphragms 17*e* and 17*f***. The weight of the particles P also affect the aerosolization of the particles $P_1$.

The powder $P_1$ can be collected and reused. The casing **17*g* collects the powder which escapes from chamber 17 through openings 17*h*. Casing 17*g* has openings 17*i*** which are covered to prevent escape of the powder $P_1$ to the atmosphere.

The chamber section **17*d* is provided with a gas inlet 26. The casing 17*g* is provided with a gas outlet 21 through the filter 18. The gas is preferably dry air or nitrogen although other gases can be used. The gas aids in aerosolizing the powder $P_1$ in the chamber section 17*d* and coating section 17*a* and along with the diaphragms 17*e* and 17*f* and speaker 17*b*. The powder P is aerosolized to $P_1$ by the speaker 17*b***.

The impregnated tow **10*b* passes through a heater 19, controlled by a temperature controller 20 and then through guides 21 and nip roller 22 which controls the width of the prepreg tape 10*c* before being wound on a takeup drum 23**.

The speakers 14_a_ and 17_b_ are separately controlled by a frequency generator 24 and power amplifier 25. It will be realized that the speakers 14_a_ and 17_b_ could have separate generators and amplifiers (not shown).

FIG. 3 shows another type of coating chamber 30 for coating the tow of fibers 10_b_. The chamber 30 is covered by square cross-sectioned casing 31. The casing 31 has a gas vent 31_a_. The chamber 30 has an inlet 32 for a gas and a diffuser screen 33 to prevent back flow of particles into pipe 32. The chamber 30 has diaphragms 30_a_ and 30_b_ at either end which are vibrated by the speaker 17_b_. The casing 31 is provided with slots 31_b_ and the chamber 30 is provided with slots 30_c_ for the tow 10_b_. The speaker 17_b_ is mounted in housing 17_c_ as in FIG. 1.

The following examples illustrate the capability of the process:

(i) Example 1 shows that the prepreg tapes made by the method are reproducible even with manual control.

(ii) Example 2 shows that the method can tailormake prepreg tapes with any desired fiber-matrix volume fraction.

(iii) Example 3 was performed with a preliminary version of the method, wherein the coating section was separate from the aerosolizer and connected by a pipe (not shown). The fiber tow was impregnated with particles on a step-by-step basis.

(iv) Example 4 shows prepreg tapes which can be consolidated to make void-free composites. It also shows that the consolidation step has the effect of averaging out local variations in the fiber-matrix volume fractions in the prepreg tape to produce a uniform composite part.

FIGS. 4A and 4B are photomicrographs taken at two stages in the method. FIG. 4A shows a prepreg 10_c_ of fibers. FIG. 4B shows that void free consolidation of the prepreg 10_c_ is readily achievable.

EXAMPLE 1

A set of six prepregging runs were performed with a preferred version of the process. The materials used were a carbon fiber tow 10 (3000 fibers/tow, Hercules AS4 fibers, Hercules, Inc., Magna, Utah) and a polyamide powder P (9.2+/−4 microns, Orgasol, made by ATOCHEM Inc., Glen Rock, N.J.). The carbon fiber tow 10 was unwound from a fiber spool 11 with the help of nip rollers 13. The tow 10 was then spread by the spreader 14 which consisted of a 10" speaker (8 Ohms, 100 Watts) mounted in a plywood housing 14_d_. The fiber tow 10 passed over the speaker 14_a_ on top of which were mounted 10 polished steel rods 14_b_ (⅜" diameter) spaced 1" apart. The rods 14_b_ were to hold the spread tow 10_a_ in position once they are spread by the speaker 14_a_. The spread tow 10_a_ passed through nip rollers 15 and entered the chamber 17. The aerosolizer consisted of a plywood speaker box 17_c_ (15" speaker 17_b_, 8 Ohms, 100 Watts) over which a cylindrical plexiglass column (8.2" internal diameter, 15" in length was mounted. Vibrating rubber diaphragms 30_a_ and 30_b_ were placed on the ends of the chamber 30 and above the speaker box 17_c_. The aerosolizer was cleaned and packed with 225 grams of powder P at the beginning of the first run. Both the aerosolizer and the spreader 14 were operated at the natural frequency of the respective systems. The tow 10_b_ was impregnated with particles P in the aerosolizer and then entered a heater (12" length) where the particles sintered and coalesced on the fibers. The resulting prepreg tape was then wound on takeup drum 23. The distance travelled by the fiber tow from the fiber spool 11 to the takeup drum 23 was 65 inches. Table I shows the values of the different variables monitored in the method. The volume fractions were calculated by weighing 28" lengths of the prepreg tapes 10_c_ and comparing the weight of an equivalent length of unimpregnated fiber tow.

TABLE I

PREPREGGING EXPERIMENTS - IDENTICAL AEROSOLIZER AND SPREADER CONDITIONS

| | | Aerosolizer | | Spreader | |
|---|---|---|---|---|---|
| No | Duration (mins) | Amplitude (rms V) | Freq (Hz) | Amplitude (rms V) | Freq (Hz) |
| 1 | 50 | 5.3-5.4 | 12.1 | 11 | 38.5 |
| 2 | 47 | 5.3-5.4 | 12.1 | 11 | 38.5 |
| 3 | 35 | 5.3-5.4 | 12.1 | 11 | 38.5 |
| 4 | 58 | 5.3-5.4 | 12.1 | 11 | 38.5 |
| 5 | 55 | 5.3-5.4 | 12.1 | 11 | 38.5 |
| 6 | 55 | 5.3-5.4 | 12.1 | 11 | 38.5 |

| No | Oven Temp (C.) | Gas Vel (cc/s) | Tow Speed (cm/s) | Vol Fraction Matrix[1] Standard Deviation ( ) |
|---|---|---|---|---|
| 1 | 215-217 | 4.34 | 1.73 | 27.8 (4.1) |
| 2 | 215-217 | 0 | 2.45 | 23.5 (5.7) |
| 3 | 215-217 | 5.72 | 2.24 | 23.6 (3.1) |
| 4 | 215-217 | 4.42 | 2.09 | 20.5 (3.2) |
| 5 | 215-217 | 4.42 | 2.03 | 22.0 (2.0) |
| 6 | 215-217 | 4.42 | 2.23 | 17.3 (3.4) |

[1]The volume fraction is calculated using material densities from the weight measurements.

The runs have identical oven temperature, aerosolizer and spreader conditions. Run 1 starts with a clean chamber and the walls get progressively caked with powder to a saturation level beyond which there is no further caking. Consequently, particle pickup is higher in run 1 as compared with the other five runs. The gas velocity of run 2 is zero and the volume fraction matrix shows a higher standard deviation than the other five runs. This indicates that a gas flow is preferred for optimum particle entrainment. The tow 10 velocities of all the runs were slightly different due to manual speed control of the motors used in the process. Run 6 indicates that the chamber needs to be replenished with powder P. Despite these discrepancies, the average volume fraction matrix was 22.5 with a standard deviation of 3.5. The corresponding numbers are 22.4 and 1.5 if the first and last runs are excluded which is a fairer test.

EXAMPLE 2

Table II shows a set of four prepregging runs all performed at different conditions with the same fiber-matrix combination and the same version of the method as in Example 1. The volume fractions attained prove that a judicious combination of aerosolizer conditions and tow velocity can be employed to make a prepreg tape with any desired volume fraction of matrix.

TABLE II

PREPREGGING EXPERIMENTS - DIFFERENT CONDITIONS

| | | Aerosolizer | | Spreader | |
|---|---|---|---|---|---|
| No | Duration (mins) | Amplitude (rms V) | Freq (Hz) | Amplitude (rms V) | Freq (Hz) |
| 1 | 60 | 5.3-5.4 | 11.6 | 11 | 38.5 |
| 2 | 61 | 6.6-6.7 | 11.4 | 11 | 38.5 |
| 3 | 30 | 7.4-7.5 | 11.4 | 11 | 38.5 |
| 4 | 40 | 7.4-7.5 | 11.8 | 11 | 38.5 |

| Oven Temp | Gas Vel | Tow Speed | Vol Fraction Matrix |
|---|---|---|---|

TABLE II-continued

| PREPREGGING EXPERIMENTS - DIFFERENT CONDITIONS | | | | |
|---|---|---|---|---|
| No | (C) | (cc/s) | (cm/s) | Standard Deviation ( ) |
| 1 | 215-217 | 4.42 | 1.94 | 11.9 (3.9) |
| 2 | 215-217 | 4.42 | 4.11 | 21.3 (3.8) |
| 3 | 215-217 | 4.42 | 1.94 | 42.2 (4.1) |
| 4 | 215-217 | 4.42 | 0.90 | 52.9 (3.2) |

EXAMPLE 3

A set of twenty-one prepregging runs were performed with an alternative version of the process in which the fiber tow, after spreading, passed through a separate impregnation chamber which was supplied with entrained particles from the aerosolizer. The aerosolizer with chamber 30 (3.15" internal diameter, 6.50" speaker, 8 Ohms, 50 Watts) and the spreader 14 (6.50" speaker, 8 Ohms, 50 Watts) were powered by the same frequency generator and amplifier (39 Hz, peak-to-peak amplitude greater than 24 V). The prepregging in chamber 30 was done in a semi-continuous mode i.e. the tow was stationary from time to time to give an effective residence time of 2 minutes in the impregnation chamber. The heater was held at 200° C. In this version of the method, nip rollers were not used. The volume fraction of the matrix was computed to be 51.8 with a standard deviation of 3.9, excluding four runs during which there were problems with fiber motion.

EXAMPLE 4

The prepreg tapes were laid up manually in a two-part mold and consolidated under pressure at 195°-200° C. for 20 minutes each. The resulting specimens were analyzed for volume fraction of fiber under an optical microscope using image analysis techniques. The results are summarized in Table III. The first three samples which were consolidated at 350 psi (2:414 Mega Pascals (MPa)) showed a few voids and a higher standard deviation in volume fraction fiber than the last two samples at 875 psi (6.034 MPa) which were essentially void-free as shown in FIG. 4B. The design of optimum consolidation cycles of powder-impregnated prepreg tapes results in the manufacture of void-free composites with a very uniform distribution of fibers across the entire composite.

TABLE III

| CONSOLIDATION EXPERIMENTS | | |
|---|---|---|
| SAMPLE # | PRESSURE (psi) | VOL FRACTION FIBER (%) (STANDARD DEVIATION) |
| 1 | 350 | 65.79 (3.91) |
| 2 | 350 | 69.79 (1.69) |
| 3 | 350 | 70.71 (4.65) |
| 4 | 875 | 74.18 (1.16) |
| 5 | 875 | 73.48 (1.05) |

There are cost advantages to the present method. First there is little capital investment. The system uses standard acoustic components including speakers 14*a* and 17*b* and generators and amplifiers 24 and 25 and standard synchronous drive motors for nip rollers 13, 15 and 22. Little energy is required for operating the system. The power requirements are low.

The method for fixing the polymer particles to the fiber surface in the aerosolizer prior to consolidation is an important component of the method and a variety of methods can be used. Currently the natural charging of the small polymer particles $P_1$ creates an electrostatic attraction which causes adherence to fibers 10*b*. Since the charging characteristics of the powders $P_1$ can vary with their composition, environmental and atmospheric conditions, it is desirable to improve this method or to develop an alternative method for attracting and/or adhering the particles to the fibers 10*b*.

Imposed electrostatics, preheating of the fibers and the use of fiber coatings as adhesives to hold the particles in position during or after they impact the individual fibers 10*b* can be used. If a large electrostatic charge is used to attract polymer particles $P_1$, fluctuations in charge carrying capacity of the powder and atmospheric conditions can be overriden. Alternatively a tubular furnace (not shown) placed at the entrance to the coating chamber 17 can be used to heat the fibers 10*b* prior to their entry into the coating chamber 17. A combination of thermal input, speed of the fiber tow 10 and heat of fusion of the polymer can provide conditions in which a particle $P_1$ will locally melt on impact and solidify in position on the fiber 10*b*. Coatings on the tow 10 can also be used. Common practices from the textile industry are used to apply 100 nanometer thick coatings of a resin onto fibers 10*b*. If a material which has a melting point below the polymer particle $P_1$ is used as a coating, it is dry and not tacky at room temperature to allow for handling. The fiber tow could be spread and handled normally. Once spread, the tow 10*a* can be heated to raise the temperature of the coating to above its melting point prior to entering the coating chamber 17. Impacting powder particles $P_1$ adhere to this coating within the coating chamber 17 and remain in place.

The fluidization and transport of particles varies with their material properties and size. The acoustic fluidization of particles by size as well as their dispersability within the fiber tow is variable by the method of the present invention. A 10 to 50 mm prepreg 10*c* was produced in the Examples; however, there is no theoretical limit to the width.

The process is controllable by automated control. Instrumentation for measurement and control of acoustic energy, thermal energy, particle size, flow rates and tow speed can be added to the process. The system can be applied to any powder matrix used for composite materials since material physical properties (density, size, acoustic power, tow speed, etc.) can be used as the input for these control algorithms.

The advantage of this system lies in the ability to make prepreg in which the powder particles are close together and have to flow over only microscopic distances in order to consolidate. Both microwave processing and thermal approaches developed can be used to heat the fibers coated with the particles.

A significant advantage of this system is its application to chopped fibers. The acoustic fluidization can be used to suspend chopped fibers along with the powders. The comingled fiber/powder combination can then be deposited onto a moving surface and can be processed to produce a chopped fiber composite. Chopped fibers can also be provided on a support screen (not shown) and the powder deposited on the fibers as they are conveyed through the chamber 17 or 30. The chopped fiber orientation can also be controlled which results in the ability to make an aligned chopped fiber prepreg. This has significant advantages for making higher strength and stiffness composites with chopped fibers than are obtained with random fiber composites.

Preferably the particles bonded on the fibers represent about 10% to 65% by volume of the fiber volume. Most preferably particle volume is 20 to 40% of the fiber volume.

The prepreg has beads of the polymer from the particles along each fiber or group of fibers. The beads are spaced uniformly on average about 1 to 1000 microns apart along the fiber(s), depending upon the fiber diameter and the particle size.

It is intended that the foregoing description of the present invention be only illustrative and that the present invention be limited only by the hereinafter appended claims.

We claim:

1. A prepreg for a laminate product which comprises a tow of fibers having beads of a thermoplastic polymer along the length of each fiber or group of fibers on the tow of fibers as shown in FIG. 4A which can be consolidated to form the laminate product as shown in FIG. 4B, wherein the prepreg has been formed by aerosolyzing a powder of the thermoplastic polymer in a chamber means around the tow of fibers using a vibrating means which produces an acoustical frequency in the chamber means to deposit the powder on the tow and heating the tow with the deposited powder to produce the prepreg with the beads.

2. The prepreg of claim 1 wherein the tow of fibers is composed of carbon.

3. The prepreg of claim 1 wherein the polymer is a polyamide.

4. The prepreg of claim 3 wherein the tow of fibers is composed of carbon.

* * * * *

UNITED STATES PATENT AND TRADEMARK OFFICE
CERTIFICATE OF CORRECTION

PATENT NO. : 5,128,199

DATED : July 7, 1992

INVENTOR(S) : Shridhar Iyer, et al.

It is certified that error appears in the above-identified patent and that said Letters Patent is hereby corrected as shown below:

On the title page, item (75) inventors: Add --Krishnamurthy Jayaraman, E. Lansing, all of Mich.--.

Figure 4B, should be deleted and replaced with attached figure 4B.

Column 3, line 7, "Ojbects" should be --Objects--.

Column 4, line 22, delete "of", second occurrence.

Column 5, line 34, "specimens" should be --specimen--.

Column 8, line 68, these table headings should be carried over to top of Column 9 and included in the column table headings.

Signed and Sealed this

Seventeenth Day of August, 1993

*Attest:*

BRUCE LEHMAN

*Attesting Officer* *Commissioner of Patents and Trademarks*